United States Patent
Olarte

(10) Patent No.: US 9,113,715 B2
(45) Date of Patent: Aug. 25, 2015

(54) ANCHORING SYSTEM FOR SEAT BACK

(71) Applicant: Alvaro Mauricio Olarte, Aventura, FL (US)

(72) Inventor: Alvaro Mauricio Olarte, Aventura, FL (US)

(73) Assignee: Series International, LLC, Aventura, FL (US)

( * ) Notice: Subject to any disclaimer, the term of this patent is extended or adjusted under 35 U.S.C. 154(b) by 95 days.

(21) Appl. No.: 13/792,970

(22) Filed: Mar. 11, 2013

(65) Prior Publication Data

US 2014/0252836 A1    Sep. 11, 2014

(51) Int. Cl.
| | | |
|---|---|---|
| A47C 4/02 | (2006.01) | |
| A47C 1/124 | (2006.01) | |
| A47C 1/121 | (2006.01) | |
| A47C 3/12 | (2006.01) | |
| B60N 2/68 | (2006.01) | |
| A47C 7/42 | (2006.01) | |

(52) U.S. Cl.
CPC ............... *A47C 1/124* (2013.01); *A47C 1/121* (2013.01); *A47C 3/12* (2013.01); *A47C 4/02* (2013.01); *A47C 7/42* (2013.01); *B60N 2/68* (2013.01); *Y10T 29/49895* (2015.01)

(58) Field of Classification Search
CPC .............. A47C 4/02; A47C 7/42; A47C 3/12; A47C 1/124; A47C 7/56; B60N 2/68
USPC ............ 297/248, 232, 452.18, 452.19, 440.1, 297/440.14, 440.2, 249, 257, 411.35, 297/411.37, 411.38, 440.21, 445.1, 446.1, 297/450.1, 452.1, 452.2, 452.4, 463.1, 297/463.2, 440.13, 440.16, 451.3; 256/65.11, 65.12; 403/6, 7, 260

See application file for complete search history.

(56) References Cited

U.S. PATENT DOCUMENTS

| | | | | |
|---|---|---|---|---|
| 1,695,101 | A | * | 12/1928 | Hoffman .................. 297/283.3 |
| 2,290,556 | A | * | 7/1942 | Hard ............................ 297/342 |
| 2,621,709 | A | * | 12/1952 | Bell ............................. 297/249 |
| 2,815,972 | A | * | 12/1957 | Lagervall ........................ 403/7 |
| 2,842,187 | A | | 7/1958 | Hendrickson |
| 3,194,601 | A | * | 7/1965 | Hoven et al. ................. 297/333 |
| 5,899,531 | A | | 5/1999 | Koehler |
| 6,698,834 | B2 | | 3/2004 | Olarte |

OTHER PUBLICATIONS

International Search Report and Written Opinion of the International Searching Authority Application No. PCT/US2014/021502 Completed: Aug. 12, 2014; Mailing Date: Aug. 27, 2014 pp. 10.

* cited by examiner

*Primary Examiner* — Syed A Islam

(74) *Attorney, Agent, or Firm* — St. Onge Steward Johnston & Reens LLC

(57) ABSTRACT

A seating system adapted for use in stadium, auditorium, and/or theater-type settings. The system utilizes seat back pins, support beams, and anchors for installing seat backs in series and without requiring custom components to account for variability in dimensions. A method for installing seat backs provides the installer with multiple degrees of freedom when adjusting the position of a seat back being installed, including lateral positioning and rotational orientation.

38 Claims, 12 Drawing Sheets

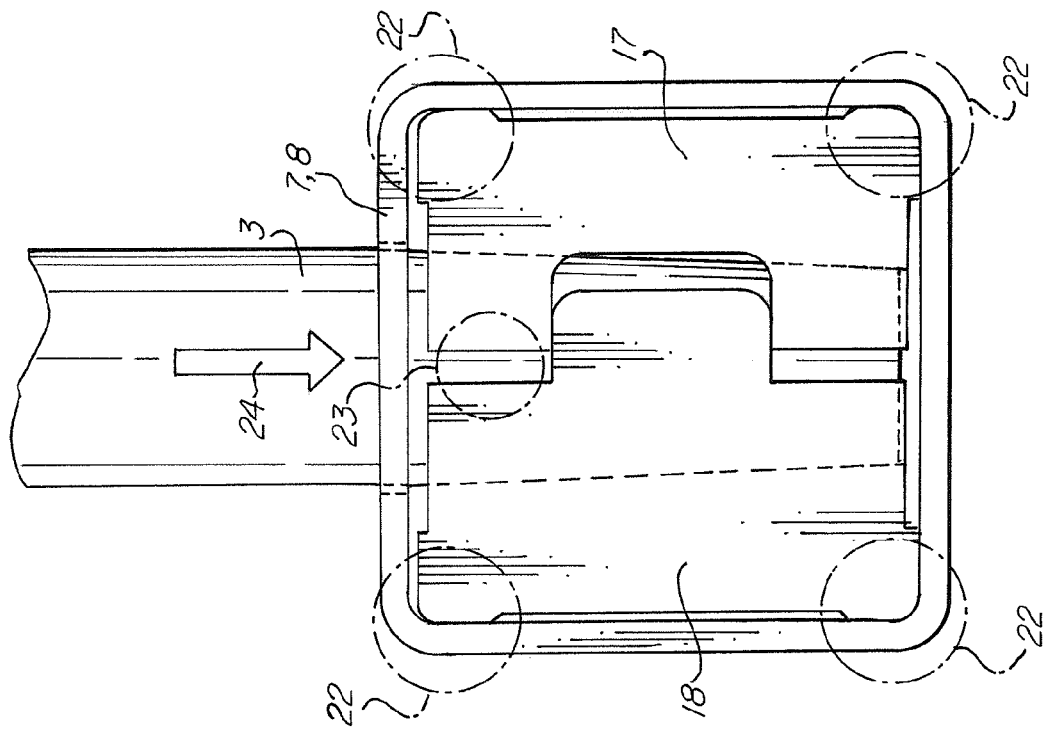
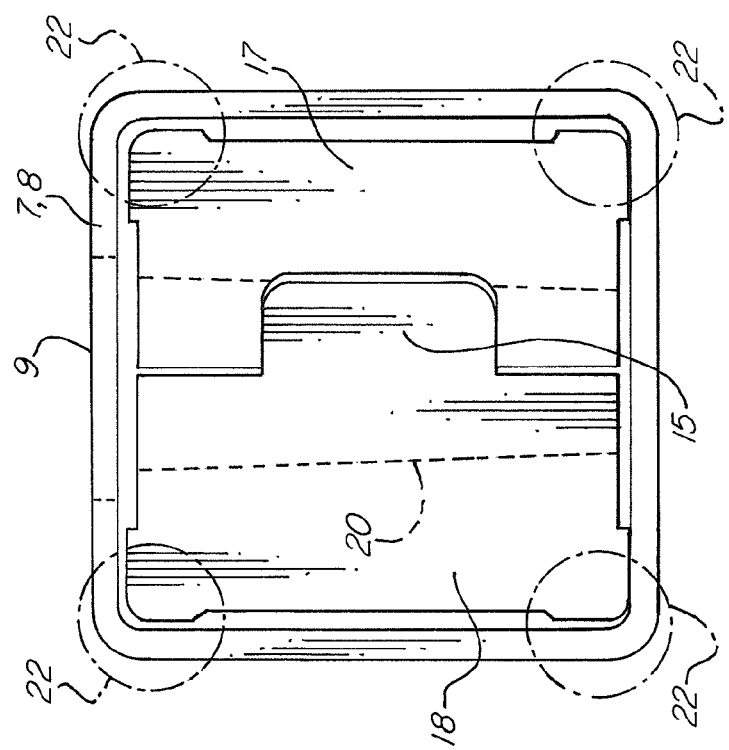

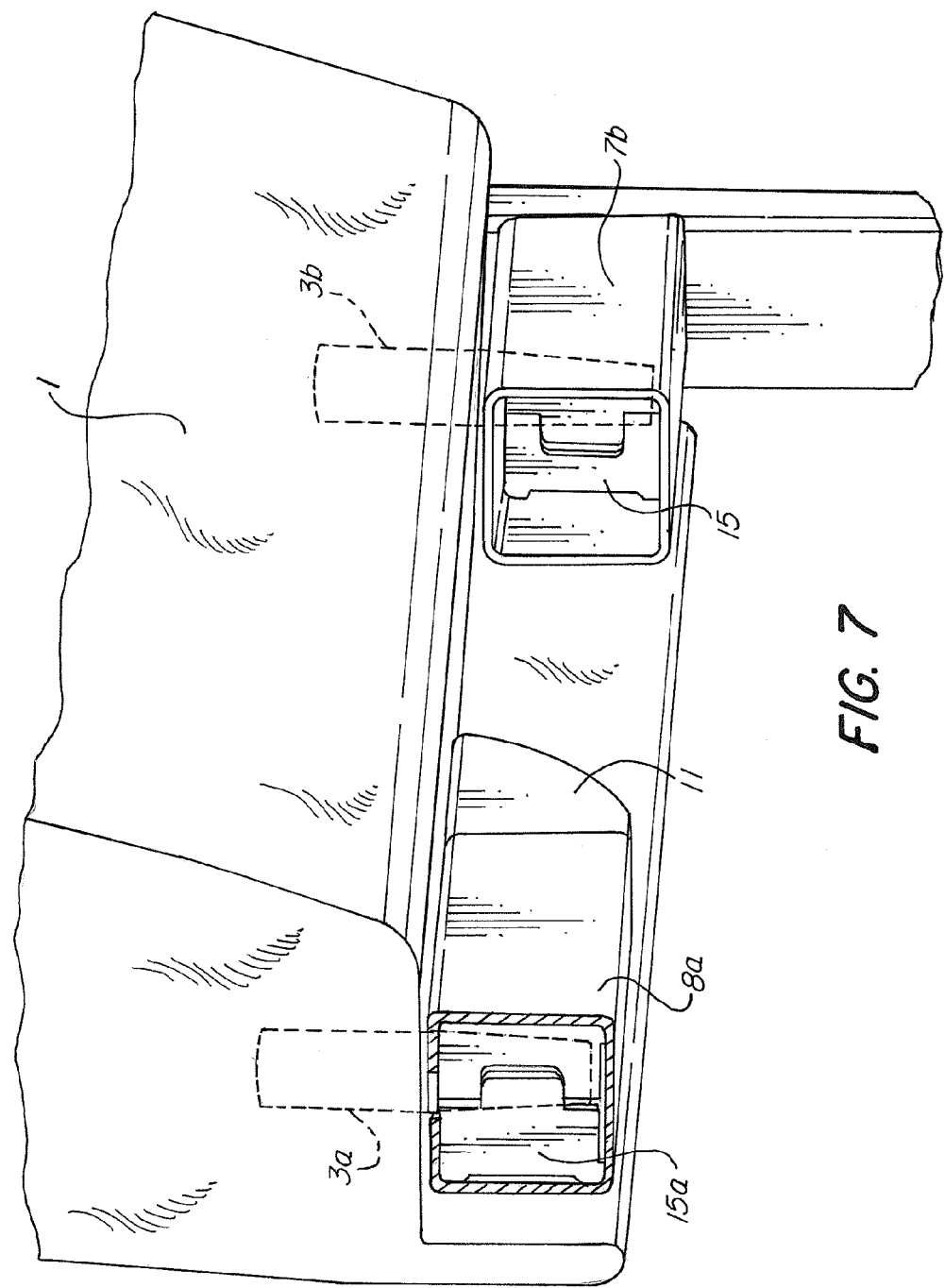

ANCHORING SYSTEM FOR SEAT BACK

FIELD OF THE INVENTION

The invention relates to seating systems and methods for installing seating systems in auditorium, stadium, and theater-type settings. More specifically, the invention relates to systems and methods for installing seat backs for a series of seats in a variety of situations.

BACKGROUND OF THE INVENTION

The design, style, and dimensions of the typical locations in which a large number of seats are needed (such as in auditoriums, theaters, or stadiums) can vary wildly from one venue to another. In some venues, rows of seats may be needed that curve around a stage or podium, while in other venues, straight rows of seats are required. The curvature of a curved row can also vary in degree from row to row as well as from venue to venue. The size and shape of the area for accommodating the seats can also vary from venue-to-venue; some venues may have rectangular areas for seats, while others may have triangular or oddly shaped areas. Further, many venues include various obstructions and features unique to each venue, such as support pillars, exits, concession stands, etc., that can impact the seating area. As a result of this variability between venues, rows of seats may have differing widths, the spacing between the seats can vary, and the orientation of one seat relative to a neighboring seat can vary.

The wide variability in venues makes the design, manufacture, and installation of seating systems more difficult and expensive. The variability makes it difficult to use a common system with uniform components across multiple installations. Designers and manufacturers are forced to design and create more components and more variations of components to accommodate different venues, including custom items that may only be useful in a single installation. Likewise, system sellers and installers must stock a wider variety and larger number of components.

Installation is also more difficult because of the need to employ a larger number of components. In any seating system, it is desirable to minimize the time and cost required to install the system. Minimizing the number of components required to complete installation is important to keeping the time and cost required low.

U.S. Pat. No. 6,698,834 to Olarte discloses a system for connecting a seat bottom to frame assemblies (legs). The seat bottom includes a pivot pin on each side of the seat bottom, each intended to be inserted into a saddle bracket mounted on each frame assembly. The '834 patent discloses that the pivot pins can be inserted into the saddle brackets over a range of angles and that varying widths between the saddle brackets can be accommodated. The '834 patent, however, does not address accommodating such variability with respect to the seat backs.

U.S. Pat. No. 2,842,187 to Hendrickson discloses a theater seat system where each seat back 12 is connected by a simple pivot 30 to standards 14 which include chair legs 16. The seat back 12 is also attached to a mechanism for controlling the recline angle of the seat back 12. The design of the seat system does not account for any variance in the distance or angle between standards 14, meaning that the only possible solutions are simply providing a different seat back 14 having a different size or shape or differently sized connection hardware.

The seating system design disclosed by U.S. Pat. No. 5,899,531 to Koehler suffers from essentially the same drawbacks as in the '187 patent to Hendrickson. Seat back 24 is connected at an upper point 48 and a lower point 50 to chair leg 30, but, again, the only way to account for any variance in the distance or angle between the legs 30 would be to provide a seat back with a different width or shape.

What is desired, therefore, is a seating system with seat back components that can be used without substantial modification across a wider variety of venues having different layouts and dimensions. It is further desired that such a system require as little component assembly as possible during installation of the seat backs despite variability in the layout or dimensions of a venue. It is further desired that the system provide installers with as many degrees of freedom as possible for positioning the seat backs during installation.

SUMMARY OF THE INVENTION

Accordingly, it is an object of the present invention to provide a seating system that can be used in a variety of venues having different layouts and dimensions but that does not require a wide variety of components to accommodate the different layouts and dimensions.

It is a further object of the invention to provide a seating system that relies primarily on a set of standard size and design components and does not require the manufacture of numerous custom components.

It is a further object of the invention to provide a seating system that is easy to install and maintain.

It is a further object of the invention to provide a seating system that provides multiple degrees of freedom for positioning the seat backs during installation.

These and other objectives are achieved by providing a system for mounting a seat back, comprising: a seat back, a pin secured to the seat back, an anchor, and a support beam. The anchor comprises an opening for receiving a portion of the pin. The support beam comprises a hollow interior for housing the anchor, a longitudinal axis along which the support beam extends, and a top opening formed on a top portion of the support beam shaped to receive the portion of the pin and to permit movement of the pin along the longitudinal axis.

In some embodiments, at least a portion of the anchor is adapted to expand upon receiving the portion of the pin. In some embodiments, the support beam further comprises an interior surface adapted to frictionally engage one or more surfaces of the anchor as a result of the portion of the anchor expanding. In some embodiments, the portion of the pin has a uniform cross-section along a longitudinal axis thereof. In some embodiments, the portion of the pin is substantially conical. In some embodiments, the anchor further comprises a first piece and a second piece adapted to engage one another. In some embodiments, the first piece and the second piece each include a substantially conical surface for engaging the portion of the pin such that the first piece and the second piece are caused to separate from one another to frictionally engage the interior surface of the support beam. In some embodiments, the support beam includes a substantially rectangular cross-section along the longitudinal axis and an end opening for receiving the anchor.

In some embodiments, the pin is a first pin, the anchor is a first anchor, the support beam is a first support beam, and the system further comprises: a second pin secured to the seat back; a second anchor, and a second support beam. The second anchor comprises an opening for receiving a portion of the second pin. The second support beam comprises a hollow interior for housing the second anchor, a longitudinal axis along which the second support beam extends, a top opening formed in an upper portion of the second support beam shaped to receive the second pin; and an interior surface adapted to frictionally engage one or more surfaces of the second anchor.

In some embodiments, at least a portion of the second anchor is adapted to expand upon receiving the portion of the second pin and the second support beam further comprises an interior surface adapted to frictionally engage one or more surfaces of the second anchor as a result of the portion of the second anchor expanding.

In some embodiments, the top opening of the second support beam is shaped to permit movement of the second pin along the longitudinal axis of the second support beam. In some embodiments, the first support beam further comprises a bottom opening formed in a bottom portion of the first support beam, wherein the bottom opening of the first support beam is shaped to receive a first fastener for securing the first pin in the first anchor and the first support beam and the second support beam further comprises a bottom opening formed in a bottom portion of the second support beam, wherein the bottom opening of the second support beam is shaped to receive a second fastener for securing the second pin in the second anchor and the second support beam.

In some embodiments, the longitudinal axis of the first support beam is not parallel to the longitudinal axis of the second support beam. In some embodiments, the longitudinal axis of the first support beam is parallel to but not coincident with the longitudinal axis of the second support beam.

The foregoing objectives and others are also achieved by providing a device for supporting a seat back that comprises an anchor and a support beam. The anchor comprises an opening for receiving a portion of a pin secured to a seat back. The support beam comprises a hollow interior for housing the anchor, a longitudinal axis along which the support beam extends; and a top opening formed on a top portion of the support beam shaped to receive the portion of the pin and to permit movement of the pin along the longitudinal axis.

In some embodiments, at least a portion of the anchor of the device is adapted to expand upon receiving the portion of the pin. In some embodiments, the support beam of the device further comprises an interior surface adapted to frictionally engage one or more surfaces of the anchor as a result of the portion of the first anchor expanding. In some embodiments, the anchor of the device further comprises a first piece and a second piece adapted to engage one another. In some embodiments, the first piece and the second piece each include a substantially conical surface for engaging the portion of the pin such that the first piece and the second piece are caused to separate from one another to frictionally engage the interior surface of the support beam. In some embodiments, the support beam includes a substantially rectangular cross-section along the longitudinal axis and an end opening for receiving the anchor. In some embodiments, the support beam further comprises a bottom opening formed in a bottom portion of the support beam, wherein the bottom opening of the support beam is shaped to receive a fastener for securing the pin in the anchor and the support beam.

Further provided is a method for mounting one or more seat backs, comprising the steps of: positioning a first seat back with a first mounting pin and a second mounting pin above a first support beam and second support beam, wherein the first support beam is supported by a first seat leg and the second support beam is supported by a second seat leg, moving the first seat back relative to the first support beam and the second support beam such that the first mounting pin is in position to be mounted to the first support beam, rotating the first seat back about an axis substantially coincident with a longitudinal axis of the first mounting pin until the second mounting pin is in position to be mounted to the second support beam, and lowering the first seat back so that the first pin engages with the first support beam and the second pin engages with the second support beam.

In some embodiments, the method further comprises the step of anchoring the seat back into place by engaging each of the first and second pins into an expandable anchor disposed in each of the first and second support beams.

In some embodiments, the method further comprises the step of securing each of the first and second pins through a bottom opening in the first and second support beams.

In some embodiments, each of the first and second support beams has a longitudinal axis, and the method further comprises installing the second support beam such that its longitudinal axis is not parallel to the longitudinal axis of the second support beam.

In some embodiments, each of the first and second support beams has a longitudinal axis, and the method further comprises installing the second support beam such that its longitudinal axis is parallel to but not coincident with the longitudinal axis of the second support beam.

In some embodiments, the method further comprises positioning a second seat back with a third mounting pin and a fourth mounting pin above a third support beam and a fourth support beam, wherein the third support beam is supported by the first seat leg and the fourth support beam is supported by a second seat leg, moving the second seat back relative to the third support beam and the fourth support beam such that the third mounting pin is in position to be mounted to the third support beam, rotating the second seat back about an axis substantially coincident with a longitudinal axis of the third mounting pin until the fourth mounting pin is in position to be mounted to the fourth support beam, and lowering the second seat back so that the third pin engages with the third support beam and the fourth pin engages with the fourth support beam.

In some embodiments, the method further comprises: installing the first seat leg at a first position on a floor, installing the second seat leg at a second position on the floor, wherein the second position is a first distance from the first position, and installing the third seat leg at a third position on the floor, wherein the third position is a second distance from the second position. In some embodiments, the second distance is different from the first distance.

In some embodiments, the step of installing the second seat leg comprises installing the second seat leg at an angular orientation that is different than the angular orientation of the first seat leg. In some embodiments, the first, second, and third positions do not fall along a straight line.

Further provided is a seating system comprising a leg; a seat bottom secured to said leg; a support beam secured to said leg; an anchor; and a seat back. The support beam comprises a hollow interior, a longitudinal axis along which the support beam extends, and a top opening formed on a top portion of the support beam. The anchor comprises an opening and is adapted to fit inside the hollow interior of the support beam. The seat back comprises a pin shaped to be inserted into the top opening in the support beam and into the opening in the anchor.

In some embodiments, the seat bottom is secured to the leg by a hinge mechanism mounted on the leg. In some embodiments, the top opening in the support beam is shaped to permit movement of the pin along the longitudinal axis of the support beam. In some embodiments, the anchor is adapted to expand inside the support beam upon insertion of the pin. In some embodiments, the anchor further comprises a first piece and a second piece adapted to engage one another. In some embodiments, the pin causes the first piece and the second piece to separate from one another to frictionally engage the interior surface of the support beam. In some embodiments, the leg comprises an arm rest.

Other objects of the invention and its particular features and advantages will become more apparent from consideration of the following drawings and accompanying detailed description.

BRIEF DESCRIPTION OF THE DRAWINGS

FIG. 1b is a larger scale view of a portion of the seat back and a leg support from FIG. 1a.

FIG. 2 is a front view of a row of seats, which includes the seat back and leg supports of FIG. 1a.

FIG. 3 is a front, exploded view of a system for anchoring the seat back of FIG. 1a.

FIG. 6a is a side detail view of the system for anchoring the seat back of FIG. 1.

FIG. 6b is the side detail view of FIG. 6a that shows a seat back anchoring pin.

FIG. 7 is side cut-away view of a system for anchoring the seat back of FIG. 1a.

DETAILED DESCRIPTION OF THE INVENTION

Figure 1A:
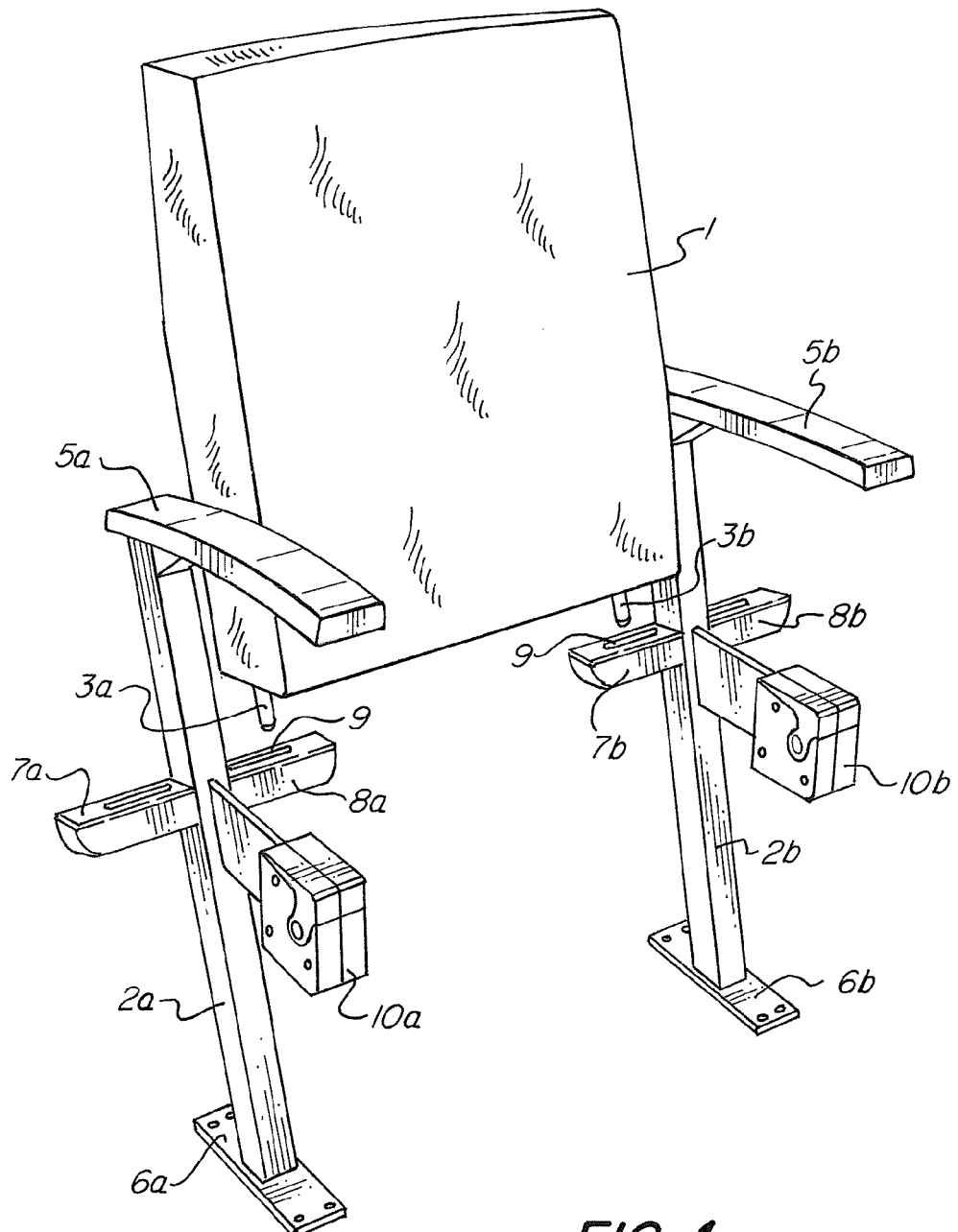
FIG. 1a is a perspective view of a seat back and leg supports.

FIG. 1a shows a seat back 1 in position to be mounted to two support legs 2a, 2b according to an embodiment of the invention. The lower portion of the seat back 1 has a first pin 3a and a second pin 3b secured to it. Each support leg 2a, 2b has an armrest 5a, 5b and a platform 6a, 6b for securing the leg to the floor. Each leg also has two support beams for supporting the seat back 1 and that form part of the system for anchoring the seat back 1 in place.

Leg 2a has support beams 7a and 8a mounted thereto. Leg 2b has support beams 7b and 8b mounted thereto. Each support beam includes an opening 9 for receiving the pin 3 on the seat back 1, as described in more detail below. The legs also include hinge mechanisms 10a, 10b for securing a seat bottom (not shown) to the legs 2a and 2b.

Figure 1B:
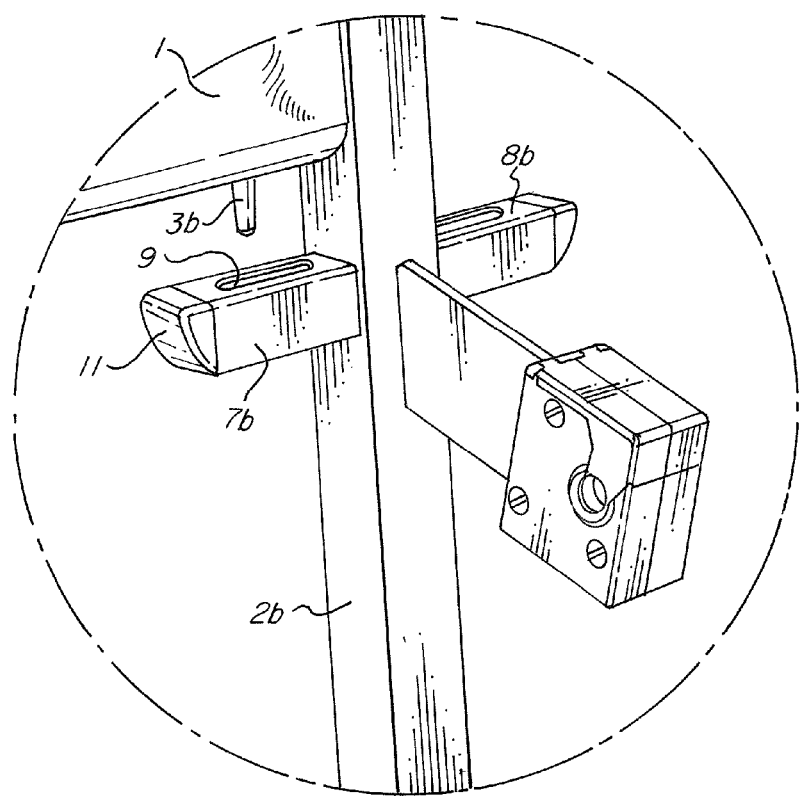

FIG. 1b is a blown up view of a portion of the seat back 1 and leg support 2b from FIG. 1a. The support beam 7b has an opening 9 for receiving the pin 3b and an end cap 11 that removably attaches to the end of the beam for the purpose of closing an interior space thereof. The support beam 8b is intended to support a second seat back (not shown). In some embodiments, support beams 7b and 8b are a single piece that is mounted to the leg 2b. In other embodiments, they are not integral, and each is an independent part that is separately mounted to the leg.

Figure 2:
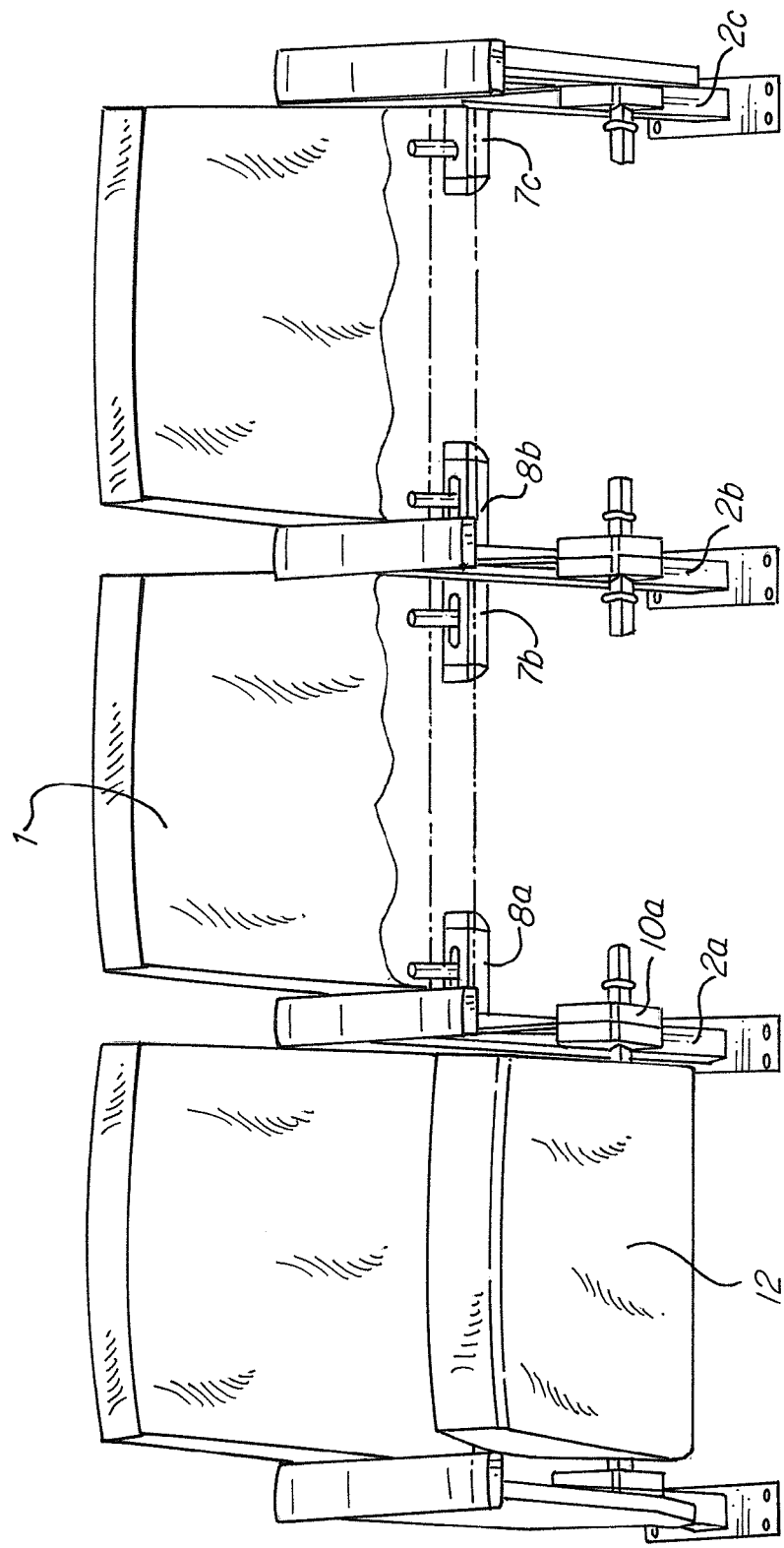

FIG. 2 shows a row of seats, which include seat backs and support legs as shown in FIG. 1a. A seat bottom 12 is also shown secured to the leg 2a via hinge mechanism 10a. Because the legs 2a and 2b can each accommodate two support beams 7a and 8a and 7b and 8b (whether they are separate components or a single, integral piece), the legs 2a and 2b each support two seat backs and two seat bottoms. The support leg 2c is an end leg for use at the end of a row. The end leg 2c has only one support beam 7c, as it needs to support only one seatback.

Figure 3:
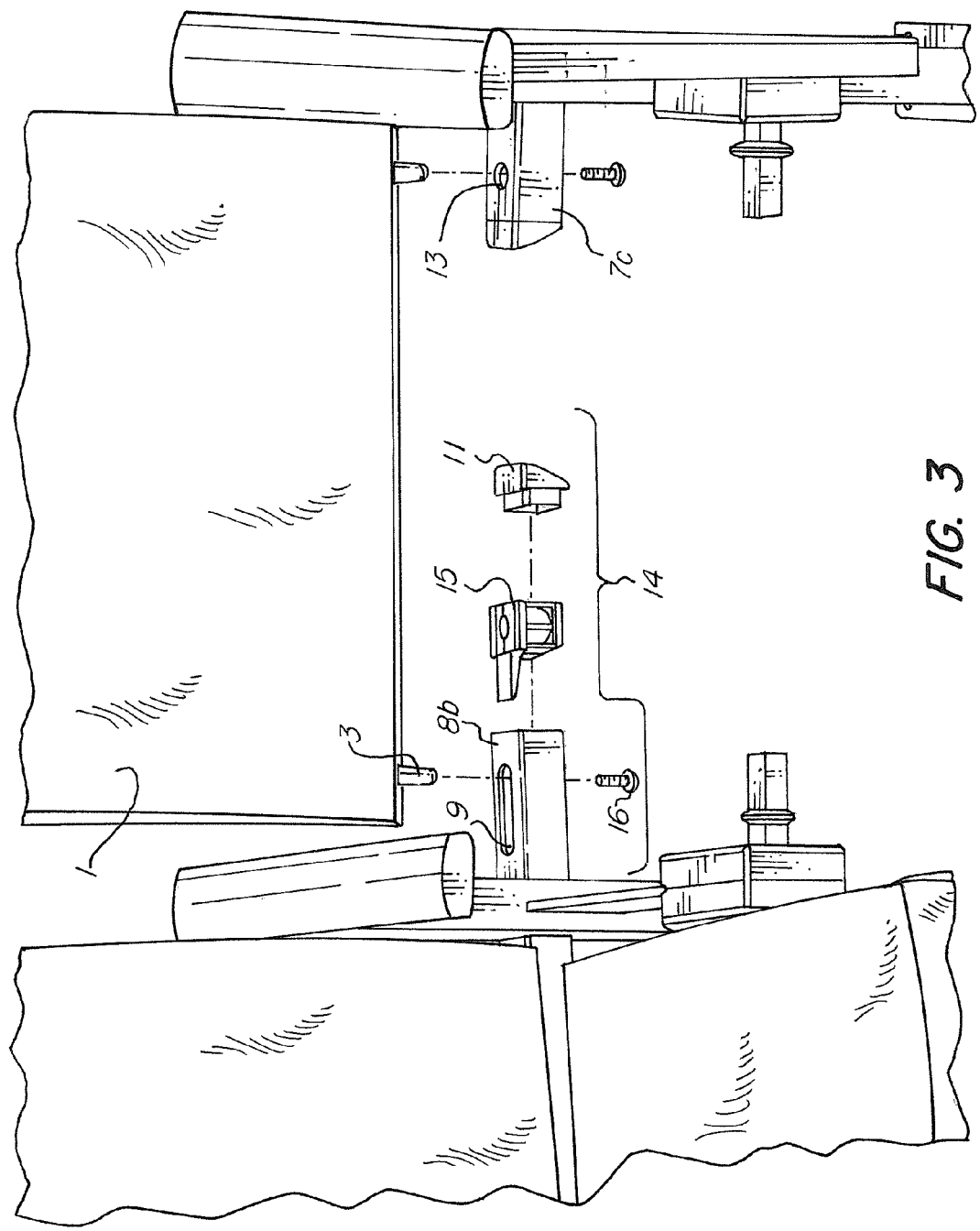

FIG. 3 shows an exploded view of an anchoring device 14 for securing the seat back 1 to a support leg. The device 14 includes the pin 3 and support beam 8b as described above, and also the anchor 15. The anchor 15 is shaped to fit inside a hollow interior of the support beam, the end of which is then capped by the end cap 11. To employ the anchor device to secure the seat back 1, the anchor 15 is slid into the end of the support beam 8b and moved into a desired position under the top opening 9 formed in the beam. The seat back 1 is then lowered so that the pin 3 engages the anchor 15 inside the beam. This causes the anchor 15 to expand (as discussed further below) and engage the interior surfaces of the support beam. The weight of the seat back creates a frictional force between the anchor and the interior surfaces of the support beam, which substantially prevents further sliding of the anchor within the support beam. To ensure that the seat back 1 cannot be easily lifted out the anchor device, a screw 16 or other fastener is used to prevent upward displacement of the seat back 1. The screw 16 engages a threaded hole in the lower part of the pin via an opening in the bottom of the beam 8b. The screw 16 helps ensure that the seat back maintains the desired pressure on the anchor, which, in turn, maintains the desired pressure on the inside surface of the support beam.

In FIG. 3, the top opening 9 on the support beam 7c is round to accommodate the generally circular cross section of the pin. On the other hand, the top opening 9 on the support beam 8b is an oblong shape. This opening shape coupled with the circular shape of the pin permits an amount of adjustability during installation of the seat backs. For example, these features can account for variances in the separation of the legs compared to the width of the seat back and variances in the front-to-back positioning of the legs, as examples.

Figure 4B:
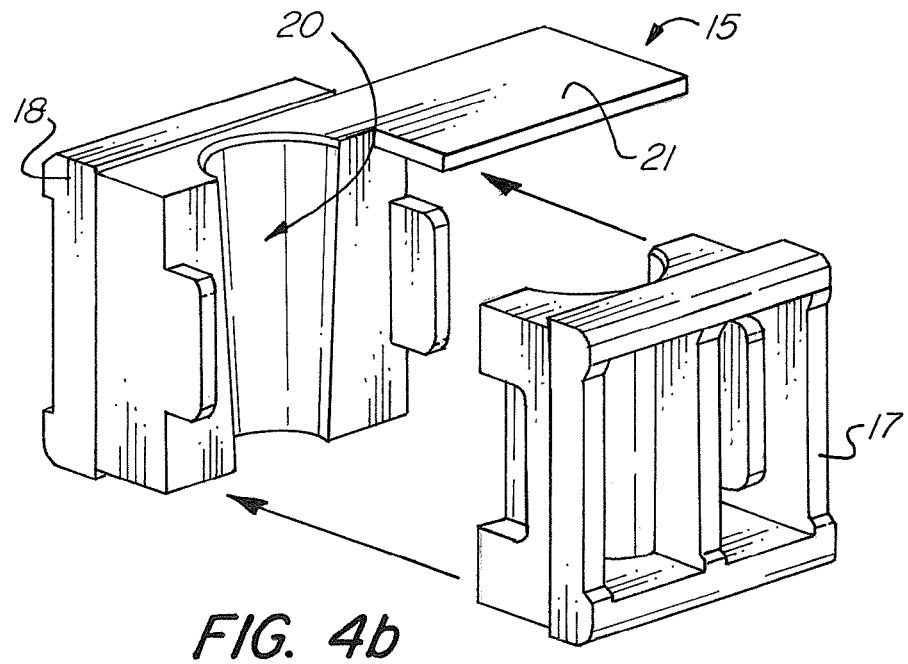
FIGS. 4a and 4b are perspective views of the seatback anchor of FIG. 3.
Figure 4A:
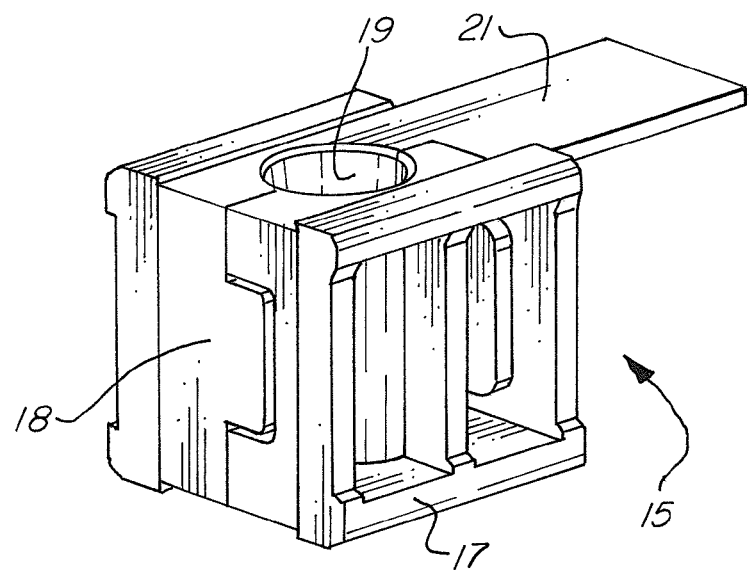

FIGS. 4a and 4b show detailed views of the anchor 15 used in this embodiment. In this embodiment, the anchor 15 is in two parts, designated by 17 and 18. The parts 17 and 18 engage each other in a nesting, form-locking manner such that a central opening 19 is formed between them. The part 21 serves as a handle for pushing or pulling the anchor once it is inside a support beam. The inner portions of the parts 17 and 18 each have an inner surface 20 associated with the opening 19. In the embodiment shown in FIGS. 4a and 4b, the surface 20 has the shape of the outer surface of a portion of a cone. This shape corresponds particularly well with seat back pins that are generally cone-shaped or that have, at least, a circular cross section.

In the embodiment shown, the anchor parts 17 and 18 are formed by molding a thermoplastic into the desired shape. The material is selected to have sufficient strength to support the seat back under the conditions of a stadium, auditorium, or theater setting. The material is also selected to have the appropriate coefficients of dynamic and static friction to enable sliding the anchor into place and a sufficiently strong frictional force once the anchor is expanded against the interior surfaces of the support beam. Other materials are used in other embodiments.

Figure 5A:
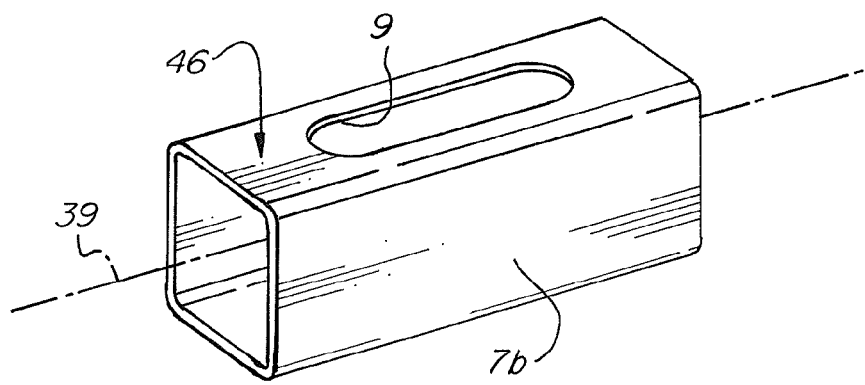
FIGS. 5a and 5b are perspective views of a support beam of FIG. 3.
Figure 5B:
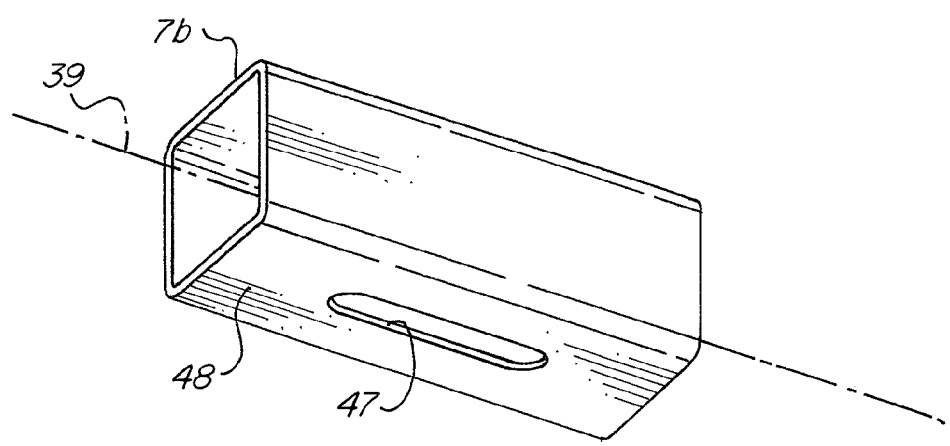

FIGS. 5*a* and 5*b* show alternative perspective views of the support beam 7*b*. In FIG. 5*a*, the top surface 46 of the beam has the top opening 9 formed therein. The top opening 9 is oblong; more specifically, the top opening 9 is an elongated rectangle with rounded ends. FIG. 5*b* shows the bottom surface 48 of the beam 7*b*, which as a bottom opening 47. The bottom opening 47 is also oblong and is intended to accommodate the screw 16 or other fastener used with the seat back pin. Support beams for use with the invention are constructed using materials having sufficient strength to support a seat back under the typical conditions it will encounter in an auditorium, stadium, and/or theater setting. The support beam shown in FIGS. 5*a* and 5*b* were constructed using extruded steel. Other materials, such as high-density polymers, plastics, other metals, wood, and/or blends thereof are used in other embodiments. Other manufacturing techniques, such as forging or molding, are also used in other embodiments.

In the embodiment shown in FIGS. 5*a* and 5*b*, the support beam has a generally square cross-section. Support beams with rectangular cross-sections such as those shown in the drawings are particularly advantageous, as that shape makes manufacturing of the beams, creation of the openings, and installation of the beams relatively straightforward. Other shapes are of course possible and are implemented in other embodiments of the invention.

FIGS. 6*a* and 6*b* show the relationship between the anchor 15 and a support beam 7 or 8 when the anchor is disposed in the interior of the beam. These figures show the end of a support beam in a view along a longitudinal axis of the beam. The areas designated by 22 indicate gaps between the edges of the anchor and the inside surface of the beam. When such gaps are present, it is possible to slide the anchor easily along the longitudinal axis of the beam. The outline of the inner surface 20 of the anchor 15 is shown in broken lines.

FIG. 6*b* shows the relationship between the anchor 15 and the beam 7 or 8 once a pin 3 has been inserted into the top opening 9 of the beam and into the opening 19 of the anchor 15. The shape of the pin 3 causes the parts 17 and 18 to separate from one another when the pin 3 is inserted into the opening 19 of the anchor. This separation is shown in the area indicated by 23. The separation or expansion of the parts 17 and 18 away from each other causes the edges of the anchor 15 to press against the inner surface of the beam 7 or 8 as shown in the areas indicated by 22. The weight of the seat back to which the pin 3 is attached provides a downward force indicated by arrow 24. This force insures a constant pressure of the pin 3 on the parts 17 and 18 of the anchor and, in turn, a constant pressure of the parts 17 and 18 on the inner surface of the beam.

Figure 6C:
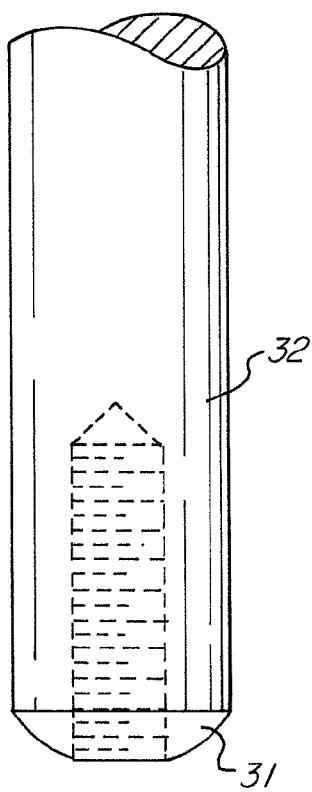
FIG. 6c shows an alternative seat back pin design.

In the embodiment shown in FIGS. 6*a* and 6B, the shape of the lower portion of the pin 3 is generally conical and corresponds to the conical shape of the inner surface 20 of the anchor. Use of the conical shape for the pin and the inner surface of the anchor is advantageous, as it ensures a tight, secure fit between the components while also making insertion of the pin into the anchor easy. In another embodiment shown in FIG. 6*c*, the pin 32 has a generally cylindrical shape with a rounded bottom 31. The rounded bottom 31 assists in inserting the pin 32 into the anchor opening 19. An anchor for use with the pin 32 may have a less dramatic conical shape to its inner surface 20, or may simply have a cylindrically shaped inner surface.

It is generally advantageous for the seat back pins used with the present invention to have a circular cross-section, at least in the portion that engages with the anchor. This enables the pins to engage the anchors at any relative angle in the plane of the cross-section of the pins. This feature helps permit the seat backs to be installed at various orientations relative to the leg supports and support beams, as described in additional detail below. Other embodiments in which the pins do not have circular cross sections are certainly within the scope of the present invention. In such embodiments, an alternative anchor design is used to accommodate the pin, and may include, for example, a third component for directly engaging the pin.

FIG. 7 provides an alternate view of the anchor 15 in the beam 7, 8. The seat back 1 has two pins 3*a* and 3*b* secured thereto. Pin 3*a* engages an anchor 15*a* disposed in the support beam 8*a*. At the same time, pin 3*b* engages anchor 15*b* disposed in support beam 7*b*. Prior to the pins 3*a* and 3*b* being fully inserted into the respective anchors, the position of the seat back 1 relative to the support beams can be adjusted within the width provided between the support legs and the size of the top openings of the support beams.

The seat back pins are constructed out of any material suitable for withstanding the forces that a seatback is likely to be subjected to in a stadium, auditorium, or theater setting. The material is selected with consideration given to the material and design of the anchor with which the pins interact. Suitable coefficients of dynamic and static friction are chosen to ensure smooth engagement with the anchor and, at the same time, a non-slippery connection once the pins are in place.

In the embodiment shown, the pins are separate parts mounted to the seat back 1. For example, the seat back 1 can have threaded holes into which the pins are secured. In other embodiments, the pins are integral with a frame portion of the seat back to which the remaining portion of the seat back, such as the padding, is secured. In still other embodiments, the pins are part of an integrated, one-piece seat back.

Figure 8:
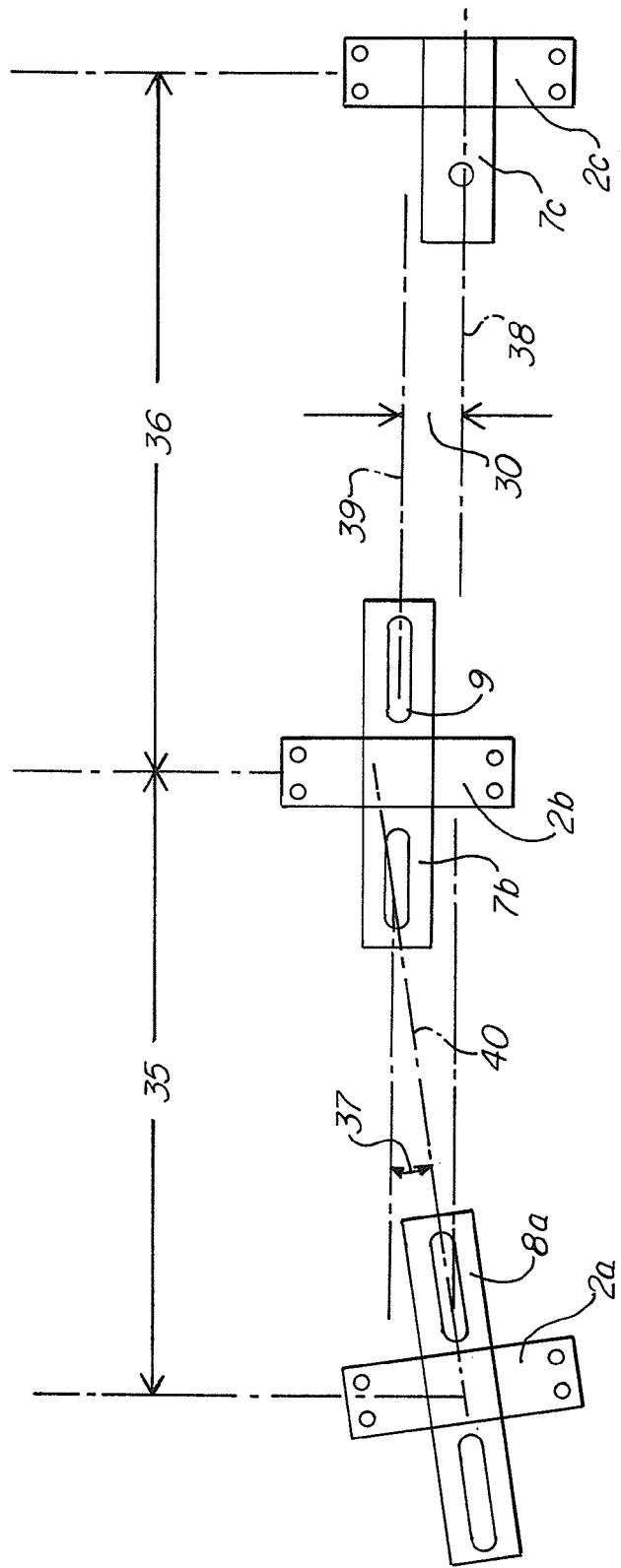
FIG. 8 is a schematic view of the positioning of seat leg supports for a row of seats for use with the present invention.

The anchoring device and system according to the present invention provides greater flexibility for installing uniform components in stadium, auditorium, or theater-style seating arrangements. FIG. 8 schematically shows examples of the types of installation variability that the present invention can account for without requiring custom components. The system affords multiple degrees of freedom for installing the seat backs, including the ability to vary the rotational orientation of a seat back relative to neighboring seat backs, as well as the lateral positioning of a seat back relative to neighboring seat backs and leg supports.

First, FIG. 8 shows a difference 30 in the front-to-back positioning of the legs 2*b* and 2*c*. Support beam 7*c* is shown having a longitudinal axis 38, and support beam 7*b* has a longitudinal axis 39. For any of a number of reasons, one leg in a row can be installed slightly in front of or slightly behind one or both of its neighboring legs. In FIG. 8, leg 2*b* is positioned slightly behind leg 2*c* as illustrated by the difference 30 between the longitudinal axes 38 and 39. The oblong shape of the top opening 9 in the support beam 8*b* permits that support beam to receive a pin at a number of different positions.

Figure 9:
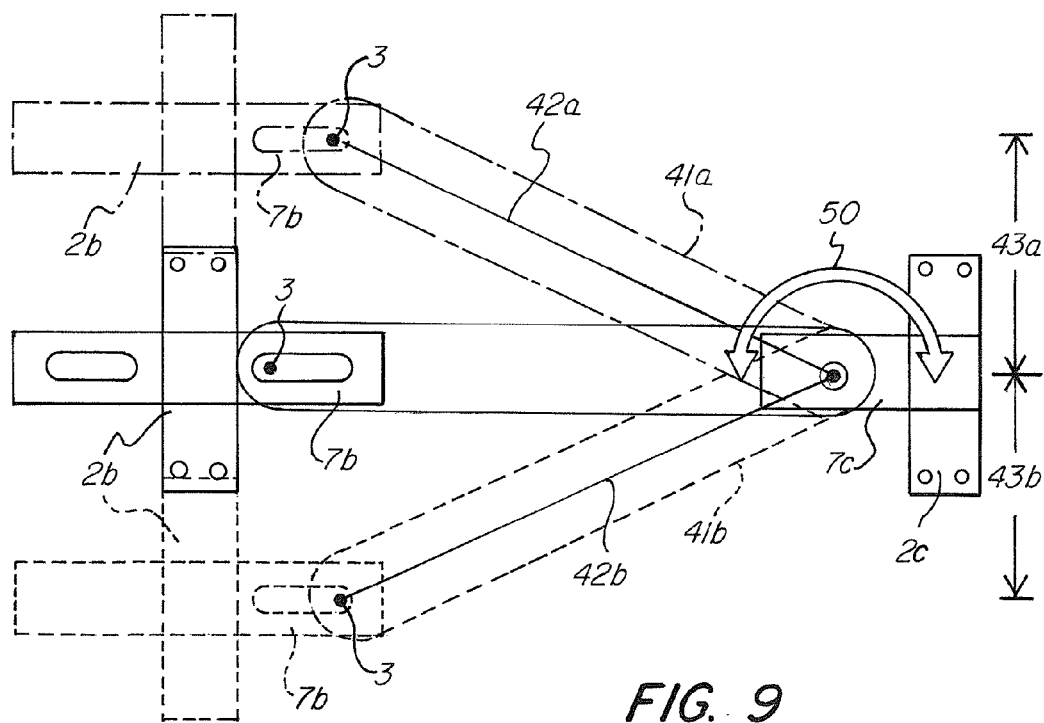
FIG. 9 is a schematic view of the possible front-to-back positioning relationships between two leg supports for use with the present invention.

This capability is illustrated in FIG. 9, which shows the range of different front-to-back positions that the support beam can accommodate. As the beam 8*b* moves from in front of the neighboring beam 7*c* to behind the neighboring beam 7*c*, the position of the pin in the opening of beam 8*b* slides from one end of the opening to the other. The broken line 41*a* shows the outline of the seat back and the line 42*a* indicates a centerline of the seatback when the support beam 7*b* is at its furthest possible distance behind the beam 7*c*. This distance is indicated by 43a. Similarly, the broken line 41b and the line 42b show the seatback when the support beam 7b is at its furthest possible distance in front of the beam 7c. This distance is indicated by 43b.

In the embodiments shown, the generally circular cross-section of the seat back pins is also important to making possible this range of different positions. This is because the generally rotationally symmetric pins can be inserted into the beams and anchors at any angle. The beam 7c is shown has having a circular opening, but in other embodiments, it also has an oblong shaped opening. Those of skill in the art will recognize that such an arrangement would allow for even more variability in the positioning of the seat back between the legs 2b and 2c.

Next, FIG. 8 shows the separation 35 between a first leg 2a and a second leg 2b, and the separation 36 between the second leg 2b and a third leg 2c. In many seating installations, the separation 35 is larger or smaller than the separation 36. Again, there may be a number of reasons why the relative separations between legs will vary. The present invention is also designed to accommodate this type of variation without resort to a separate set of components, such as a different sized seat back.

Figure 10:
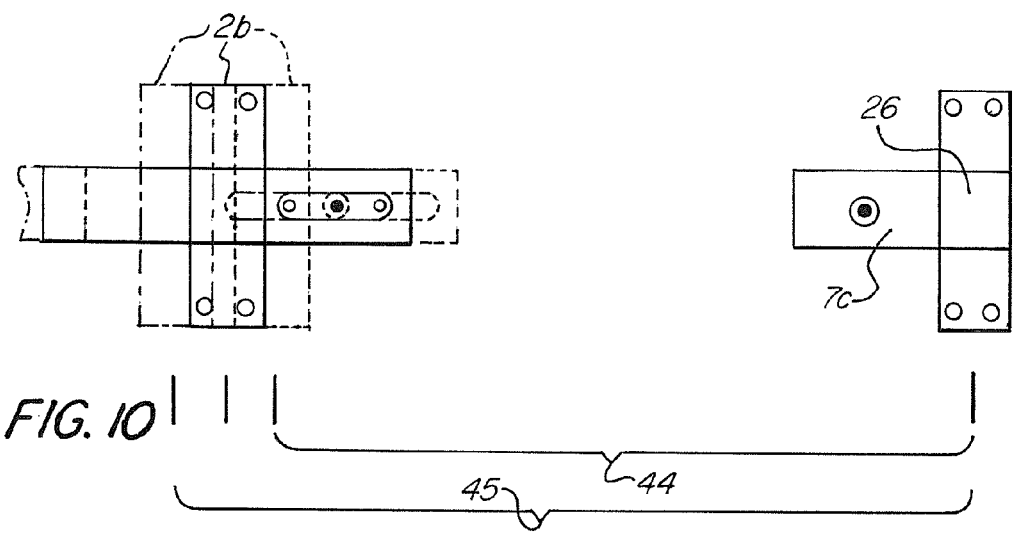
FIG. 10 is a schematic view of the possible side-to-side positioning relationships between two leg supports for use with the present invention.

FIG. 10 illustrates the way in which the invention accommodates different distances between the legs. The oblong shape of the opening 9 permits a width variability according to its size. The smallest distance between the legs 2b and 2c that can be accommodated by the support beam 7b is indicated by 44, while the largest distance is indicated by 45. As in FIG. 9, the beam 7c has a circular opening instead of an oblong opening. Those of skill in the art will again recognize that using a beam with an oblong opening in the place of beam 7c will provide additional adjustability for securing the seat back between the support legs.

Figure 11:
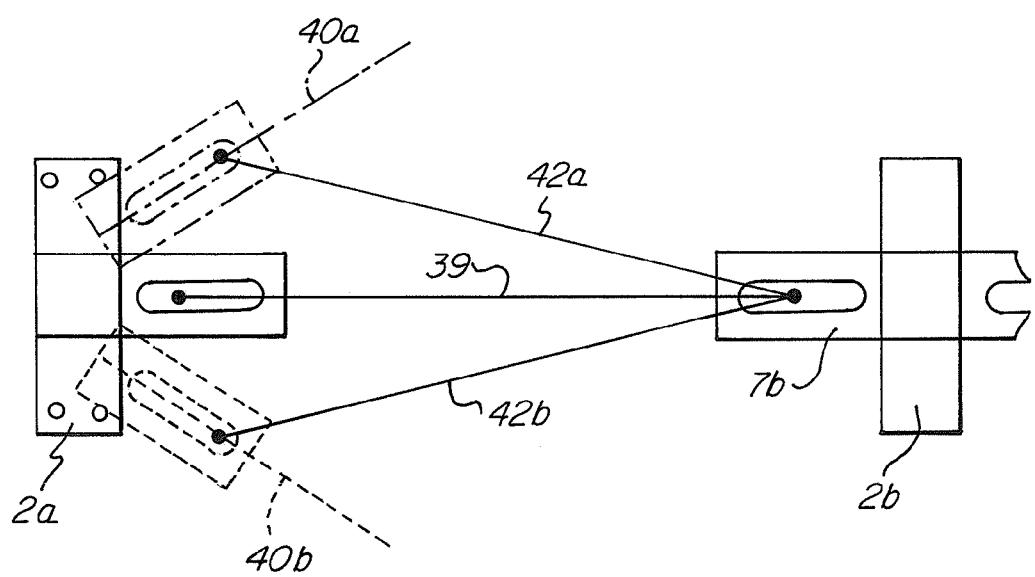
FIG. 11 is a schematic view of the possible rotational positioning relationships between two leg supports for use with the present invention.

Next, FIG. 8 shows a different rotational orientation between the first leg 2a and the second leg 2b. The difference is illustrated by the angle 37 between the longitudinal axis 40 of the support beam 8a and the longitudinal axis 39 of the support beam 7b. The present invention can account for such rotational variability as well. This is illustrated in additional detail in FIG. 11. Much like what is shown in FIG. 9, the rotational variability is accounted for by the oblong shape of the top opening in conjunction with the circular cross-section of the seat back pins. Broken line 40a indicates the longitudinal axis of the support beam 8a at one extreme of acceptable rotation, at which point the centerline of the seat back falls along line 42a. Broken line 40b indicates the longitudinal axis of the support beam 8a at the other extreme of acceptable rotation, at which point the centerline of the seat back falls along line 42b.

Although the seat backs depicted in the embodiments shown in the figures include two pins, other embodiments utilize only a single pin. In those embodiments, the pin is typically located in the central portion of the bottom of the seat back and engages a single support beam. Such embodiments also permit rotational and lateral adjustability of the seat back relative to the support beam and the remaining seat hardware.

A method of installing a seat back according to the present invention will now be described. First, the required number of leg supports are installed throughout the desired area to accommodate the desired number of seats. Because of the variability in the venue, the installation of the leg supports may lack uniformity across the entire venue. For example, a front row may have a larger separation between leg supports than a row further back. Also, one or more leg supports may have to be installed at a different angular orientation relative to neighboring leg supports, or slightly in front of or behind neighboring leg supports, such that three or more leg supports are not located on a straight line. Further, the relative angles between leg supports can vary as a result of variations in the curvature of rows.

In some embodiments, support beams for the seat backs are integral with the leg supports. In other embodiments, the support beams are separate components that may be installed on the support legs either before or after the support legs are in place in the venue.

Once the support beams are in place, the installer places the anchors in position within the support beams. This initial positioning is only a rough estimate of the final location of the anchors. Next, the installer positions a seat back above the support beams and moves it such that one of the pins is in position above the support beam and anchor that will be engaged by that pin. The installer than rotates the seat back around that pin until the other pin is in position above the other support beam and anchor. The installer then lowers the seatback such that the pins enter the interior of the support beam and engage the anchors.

In situations where additional adjustment of the seat back is desired, the installer can lift the seat back slightly such that the pins are not fully seated in the anchors and then move the seat back along the permitted path. The seat back can be moved as long as the frictional force between the anchors and support beams can be overcome without damaging force being applied to the pins and seat back. This is typically possible when the pins are not causing the full expansion of the anchors such as when only a partial insertion of the pins into the anchor has been achieved. This technique can also be used to move a single anchor within a support beam in order to position it appropriately relative to another anchor in a separate beam. The installer can partially insert the first pin in the anchor to be moved and move the seat back close to the desired position and the anchor will slide within the beam.

Once the pins are seated in the anchors, the installer attaches and tightens the fasteners that engage the pins from the bottom of the support beam. The process is then repeated with each seat back to be installed in the venue. Seat bottoms are installed independently of the seat backs, and can be installed before or after the seat backs depending on the design of the system.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for mounting a seat back, comprising:
   a seat back;
   a pin secured to said seat back, said pin comprising a longitudinal axis;
   an anchor comprising:
      an opening for receiving a portion of said pin; and
   a support beam comprising:
      a hollow interior for housing said anchor;
      a longitudinal axis along which said support beam extends; and
      a top opening formed on a top portion of said support beam shaped to receive the portion of said pin and to permit movement of said pin along said longitudinal axis of said support beam;
      wherein said support beam is arranged such that its longitudinal axis is substantially perpendicular to the longitudinal axis of said pin when said pin is received in said anchor.

2. The system of claim 1, wherein at least a portion of said anchor is adapted to expand upon receiving said portion of said pin.

3. The system of claim 2, wherein said support beam further comprises an interior surface adapted to frictionally engage one or more surfaces of said anchor as a result of said portion of said anchor expanding.

4. The system of claim 3, wherein said portion of said pin has a uniform cross-section along the longitudinal axis thereof.

5. The system of claim 3, wherein said portion of said pin is substantially conical.

6. The system of claim 3, wherein said anchor further comprises a first piece and a second piece adapted to engage one another.

7. The system of claim 6, wherein said first piece and said second piece each include a substantially conical surface for engaging said portion of said pin such that said first piece and said second piece are caused to separate from one another to frictionally engage said interior surface of said support beam.

8. The system of claim 1, wherein said support beam includes a substantially rectangular cross-section along the longitudinal axis thereof and an end opening for receiving said anchor.

9. The system of claim 3, wherein said pin is a first pin, said anchor is a first anchor, and said support beam is a first support beam, said system further comprising:
a second pin secured to said seat back, said second pin comprising a longitudinal axis;
a second anchor, comprising:
an opening for receiving a portion of said second pin;
a second support beam comprising:
a hollow interior for housing said second anchor;
a longitudinal axis along which said second support beam extends;
a top opening formed in an upper portion of said second support beam shaped to receive said second pin; and
an interior surface adapted to frictionally engage one or more surfaces of said second anchor;
wherein said second support beam is arranged such that its longitudinal axis is substantially perpendicular to the longitudinal axis of said second pin when said second pin is received in said second anchor.

10. The system of claim 9, wherein at least a portion of said second anchor is adapted to expand upon receiving said portion of said second pin; and
wherein said second support beam further comprises an interior surface adapted to frictionally engage one or more surfaces of said second anchor as a result of said portion of said second anchor expanding.

11. The system of claim 9, wherein said top opening of said second support beam is shaped to permit movement of said second pin along said longitudinal axis of said second support beam.

12. The system of claim 10, wherein said first support beam further comprises a bottom opening formed in a bottom portion of said first support beam, wherein said bottom opening of said first support beam is shaped to receive a first fastener for securing said first pin in said first anchor and said first support beam; and
said second support beam further comprises a bottom opening formed in a bottom portion of said second support beam, wherein said bottom opening of said second support beam is shaped to receive a second fastener for securing said second pin in said second anchor and said second support beam.

13. The system of claim 10, wherein said longitudinal axis of said first support beam is not parallel to said longitudinal axis of said second support beam.

14. The system of claim 10, wherein said longitudinal axis of said first support beam is parallel to but not coincident with said longitudinal axis of said second support beam.

15. A device for supporting a seat back, comprising:
an anchor comprising:
an opening for receiving a portion of a pin secured to a seat back, said pin comprising a longitudinal axis;
a support beam comprising:
a hollow interior for housing said anchor;
a longitudinal axis along which said support beam extends; and
a top opening formed on a top portion of said support beam shaped to receive the portion of the pin and to permit movement of the pin along said longitudinal axis of said support beam;
wherein said support beam is arranged such that its longitudinal axis is substantially perpendicular to the longitudinal axis of said pin when said pin is received in said anchor.

16. The device of claim 15, wherein at least a portion of said anchor is adapted to expand upon receiving the portion of the pin.

17. The device of claim 16, wherein said support beam further comprises an interior surface adapted to frictionally engage one or more surfaces of said anchor as a result of said portion of said first anchor expanding.

18. The device of claim 17, wherein said anchor further comprises a first piece and a second piece adapted to engage one another.

19. The device of claim 18, wherein said first piece and said second piece each include a substantially conical surface for engaging the portion of the pin such that said first piece and said second piece are caused to separate from one another to frictionally engage said interior surface of said support beam.

20. The device of claim 19, wherein said support beam includes a substantially rectangular cross-section along the longitudinal axis and an end opening for receiving said anchor.

21. The device of claim 20, wherein said support beam further comprises a bottom opening formed in a bottom portion of said support beam, wherein said bottom opening of said support beam is shaped to receive a fastener for securing the pin in said anchor and said support beam.

22. A method for mounting one or more seat backs, comprising:
positioning a first support beam and a second support beam, each comprising a longitudinal axis along which it extends, wherein said first support beam is supported by a first seat leg and said second support beam is supported by a second seat leg;
positioning a first seat back with a first mounting pin and a second mounting pin above the first support beam and second support beam;
moving the first seat back relative to the first support beam and the second support beam such that the first mounting pin is in position to be mounted to the first support beam;
rotating the first seat back about an axis substantially coincident with a longitudinal axis of the first mounting pin until the second mounting pin is in position to be mounted to the second support beam, wherein the longitudinal axis of the first mounting pin is substantially perpendicular to the longitudinal axis of the first support beam; and lowering the first seat back so that the first pin engages with the first support beam and the second pin engages with the second support beam.

23. The method of claim 22, further comprising the step of anchoring the seat back into place by engaging each of the first and second pins into an expandable anchor disposed in each of the first and second support beams.

24. The method of claim 23, further comprising the step of securing each of the first and second pins through a bottom opening in the first and second support beams.

25. The method of claim 22, further comprising:
installing the second support beam such that its longitudinal axis is not parallel to the longitudinal axis of the second support beam.

26. The method of claim 22, further comprising:
installing the second support beam such that its longitudinal axis is parallel to but not coincident with the longitudinal axis of the second support beam.

27. The method of claim 22, further comprising
positioning a third support beam and a fourth support beam, each comprising a longitudinal axis along which it extends, wherein said third support beam is supported by the first seat leg and said fourth support beam is supported by a third seat leg;
positioning a second seat back with a third mounting pin and a fourth mounting pin above the third support beam and the fourth support beam;
moving the second seat back relative to the third support beam and the fourth support beam such that the third mounting pin is in position to be mounted to the third support beam;
rotating the second seat back about an axis substantially coincident with a longitudinal axis of the third mounting pin until the fourth mounting pin is in position to be mounted to the fourth support beam, wherein the longitudinal axis of the third mounting pin is substantially perpendicular to the longitudinal axis of the third support beam; and
lowering the second seat back so that the third pin engages with the third support beam and the fourth pin engages with the fourth support beam.

28. The method of claim 27, further comprising:
installing the first seat leg at a first position on a floor;
installing the second seat leg at a second position on the floor, wherein the second position is a first distance from the first position; and
installing the third seat leg at a third position on the floor, wherein the third position is a second distance from the second position.

29. The method of claim 28 wherein the second distance is different from the first distance.

30. The method of claim 28, wherein the step of installing the second seat leg comprises installing the second seat leg at an angular orientation that is different than the angular orientation of the first seat leg.

31. The method of claim 28, wherein the first, second, and third positions do not fall along a straight line.

32. A seating system, comprising:
a leg;
a seat bottom secured to said leg;
a support beam secured to said leg, comprising:
a hollow interior;
a longitudinal axis along which said support beam extends; and
a top opening formed on a top portion of said support beam;
an anchor comprising an opening and adapted to fit inside said hollow interior of said support beam; and
a seat back comprising a pin shaped to be inserted into said top opening in said support beam and into said opening in said anchor, said pin comprising a longitudinal axis;
wherein said support beam is arranged such that its longitudinal axis is substantially perpendicular to the longitudinal axis of said pin when said pin is inserted into said anchor; and
wherein said top opening permits movement of the pin along said longitudinal axis of said support beam.

33. The system of claim 32, wherein said seat bottom is secured to said leg by a hinge mechanism mounted on said leg.

34. The system of claim 32, wherein said top opening in said support beam is shaped to permit movement of said pin along said longitudinal axis of said support beam.

35. The system of claim 32, wherein said anchor is adapted to expand inside said support beam upon insertion of said pin.

36. The system of claim 35, wherein said anchor further comprises a first piece and a second piece adapted to engage one another.

37. The system of claim 36, wherein said pin causes said first piece and said second piece to separate from one another to frictionally engage said interior surface of said support beam.

38. The system of claim 36, wherein said leg comprises an arm rest.

* * * * *